United States Patent [19]

Okuda et al.

[11] Patent Number: 5,127,667
[45] Date of Patent: Jul. 7, 1992

[54] SUSPENSION CONTROL APPARATUS

[75] Inventors: Eiichiro Okuda, Habikino; Masuo Takigawa, Ikoma, both of Japan

[73] Assignee: Matsushita Electric Industrial Co., Ltd., Kadoma, Japan

[21] Appl. No.: 611,802

[22] Filed: Nov. 13, 1990

[30] Foreign Application Priority Data

Nov. 13, 1989 [JP] Japan .................................. 1-294508
Dec. 14, 1989 [JP] Japan .................................. 1-325064
Apr. 16, 1990 [JP] Japan .................................. 2-100011
Apr. 16, 1990 [JP] Japan .................................. 2-100013
Apr. 25, 1990 [JP] Japan .................................. 2-109028

[51] Int. Cl.⁵ ............................................ B60G 21/02
[52] U.S. Cl. .................................. 280/707; 364/424.05
[58] Field of Search ................. 280/689, 702, 703, 707; 364/424.05

[56] References Cited

U.S. PATENT DOCUMENTS 4,065,154 12/1977 Glaze .................................. 280/707
4,625,992 12/1986 Tanaka et al. ..................... 280/707
4,655,440 4/1987 Eckert ................................. 280/707
4,678,203 7/1987 Röhner et al. ..................... 280/707
4,717,173 1/1988 Sugasawa et al. .................. 280/707

FOREIGN PATENT DOCUMENTS 0166313 6/1987 European Pat. Off. .
63-68413 3/1988 Japan .
63-166614 7/1988 Japan .
1-202511 8/1989 Japan .
2215287 9/1989 United Kingdom .

Primary Examiner—Charles A. Marmor
Assistant Examiner—Tamara L. Graysay
Attorney, Agent, or Firm—Cushman, Darby & Cushman

[57] ABSTRACT

Pitching motion of bouncing, bottoming, bumpyroad driving and braking of a vehicle during driving is correctly grasped by computing and map-retrieving from output signal of a vehicle speed sensor, output signal of a brake switch and output signal of a pitch angular velocity sensor for detecting angular velocity about a pitch axis of the vehicle; and pitching motion of the vehicle is restrained by the adjusting damping force of shockabsorbers of the suspension control apparatus.

12 Claims, 8 Drawing Sheets

SUSPENSION CONTROL APPARATUS

FIELD OF THE INVENTION AND RELATED ART STATEMENT

1. Field of the Invention

The present invention relates to a suspension control apparatus for controlling a vehicle posture by changing damping force of a shock absorber so as to decrease pitching motion of the vehicle during driving.

2. Description of the Related Art

When a vehicle is driving on an undulated surface road, the vehicle makes periodic motion in a vertical direction due to resonance of the spring suspension. This periodic motion of the vehicle is called a bouncing motion. In the bouncing motion, a driver of the vehicle and a fellow passenger have a feeling like floating on the sea. As a result, some will get carsick, resulting in poor riding comfort.

Immediately after a vehicle passes over a big projection of an uneven road, the vehicle receives a great shock from the projection in a vertical direction of the vehicle. This great shock received by the vehicle is called a bottoming motion. At this bottoming, that is, at the time of the bottoming motion, the driver and the fellow passenger feel the great shock. And, when the vehicle is driving on the very bumpy road, namely, the vehicle receives shocks continuously, road contact area of tires decreases. The state that the vehicle receives the continuous shocks is called bumpy-road driving. Therefore, when the vehicle is in the bumpy-road driving, it makes the driving stability and riding comfort poor.

In order to solve these problems, a conventional suspension control apparatus detects the pitching motion, that is the periodical vertical motion, the great shock or the continuous shock in vertical direction, by inferring from change of the vehicle height or change of stroke of shock absorbers. Then the damping force of the shock absorbers for restraining the pitching motion are controlled, by signals in response to the change of the vehicle height or change of stroke of the shock absorber during driving on the undulated surface road, the uneven road or the very bumpy road.

When the driving vehicle is braked, pitching motion of the vehicle, namely, a nose-diving motion takes place and more load is added to the front suspension due to the inertial force of the vehicle. In order to decrease the nose-diving motion of the vehicle during the braking, the above-mentioned conventional suspension control apparatus provides a brake switch which detects the braking whether a brake is operated by a driver or not. When the brake switch is in the ON-state, the conventional suspension control apparatus judges that the vehicle is braking, and controls to increase the damping force of the shock absorber. Thereby, the pitching motion of the vehicle, namely, the nose-diving motion of the vehicle during braking, is restrained by such conventional suspension control apparatus.

On the other hand, in case of measuring the distance between the bottom of vehicle body and the road surface in order to detect the change of vehicle height, a distance measuring instrument, e.g. ultra-sonic sensors, are mounted on the vehicle body near the road surface. Therefore, the ultra-sonic sensors are liable to be covered with mud, dust or snow and as a result, the ultra-sonic sensors may malfunction. Even if the ultra-sonic sensors are operated while clean, output signals from the ultra-sonic sensors may show an incorrect vehicle posture, because the output signals of it show the only interval between the road surface and the part of vehicle body where the ultra-sonic sensor is just mounted.

In the conventional suspension control apparatus wherein a stroke of a shock absorber is detected as a voltage outputted by a variable resistor to detect the vehicle height, and an additional problem is that a sliding part of the variable resistor may wear away. Furthermore, plural detecting devices are mounted on plural shock-absorbers, respectively, and the signal processing therefore needs complicated operation. Therefore, such conventional suspension control apparatuses lack durability and still reliability, and still has complicated operation system.

In the conventional suspension control apparatus for restraining pitching motion or nose-diving motion of the vehicle at braking by using the brake switch, such suspension control apparatus may make a false determination that the vehicle is braking when the brake pedal is touched by the foot of the driver even slightly. As the brake pedal generally has a playing interval at its early stroke, there is a case that the vehicle is not really braking even if the brake switch is in ON-state. Therefore, the damping force of the shock absorber is wrongly controlled when there is no nose-diving motion of the vehicle. In such case, the riding comfort becomes worse because of incorrect controlling of the damping force.

The Japanese published unexamined patent application No. Sho 63-68413 (Tokkai Sho 63-68413) discloses another conventional suspension control apparatus having a vehicle speed sensor and three angular velocity sensors for directly detecting a vehicle motion behavior. The three angular velocity sensors detect a yaw angular velocity, a pitch angular velocity and a roll angular velocity. Thereby the vehicle behavior is grasped and the damping force of the shock absorber is controlled in response to the vehicle behavior.

The above-mentioned yaw angular velocity is an angular velocity in a rotation about vertical line (yaw axis) at a center of the vehicle. The pitch angular velocity is an angular velocity in a rotation about a lateral axis (pitch axis) of the vehicle. The roll angular velocity is an angular velocity in a rotation about a longitudinal axis (roll axis) of the vehicle.

This conventional suspension control apparatus (Tokkai Sho 63-68413), which is for controlling to decrease a rolling motion of the vehicle behavior by using these signals from three angular velocity sensors, has the following problems. An arithmetic unit of the suspension control apparatus carries out a complicated computing by using three output signals of the yaw angular velocity sensor, the pitch angular velocity sensor and the roll angular velocity sensor. Therefore, this suspension control apparatus needs a considerable time for computing these data. For example, in case of using a CPU (Central Processing Unit) or 8 bit as the arithmetic unit, the operation time for computation of a control signal, namely, the time period from reception of detection signals the arithmetic unit to issuance of output signal to the actuators takes about 20 msec. Therefore, the apparatus having the CPU of 8 bit can not control in response to a sharp or quick pitching motion during driving. Therefore, the conventional suspension control apparatus necessitates to use a higher speed CPU as the arithmetic unit, such as a CPU of 16 bit for controlling to decrease such pitching motion. However, to use such high speed CPU in the vehicle unduly increases the manufacturing cost of the vehicle.

OBJECT AND SUMMARY OF THE INVENTION

An object of the present invention is to provide a suspension control apparatus which can achieve a high stability of a vehicle behavior and at the same time an improved ride comfort of the vehicle at bouncing, bottoming, and at bumpy-road driving or braking, without increase of manufacturing cost.

In order to achieve the above-mentioned object, the suspension control apparatus of the present invention comprises:

a vehicle speed sensor for detecting speed of a vehicle, a pitch angular velocity sensor for detecting angular velocity about a pitch axis of the vehicle, bouncing detection means which detects bouncing of the vehicle by an output signal of the vehicle speed sensor and an output signal of the pitch angular velocity sensor, bottoming detection means which detects bottoming of the vehicle by the output signal of the vehicle speed sensor and the output signal of the pitch angular velocity sensor, bumpy-road drive detection means which detects bumpy-road driving of the vehicle by the output signal of the pitch angular velocity sensor, a brake switch which detects whether a brake pedal is depressed or not, braking detection means which detects braking of the vehicle by an output signal of the brake switch and the output signal of the pitch angular velocity sensor, and shockabsorber means whereof damping force is adjusted in response to output signal from the bouncing detection means, the bottoming detection means, the bumpy-road drive detection means or the braking detection means.

In accordance with the suspension control apparatus of the present invention, bouncing, bottoming, bumpy-road driving and braking of the vehicle are detected by output signals of the vehicle speed sensor and the pitch angular velocity sensor. Therefore, the suspension control apparatus of the present invention does not have malfunction by mud, dust or snow on the road in case of measuring vehicle height with the above-mentioned ultrasonic sensor. In this way, the vehicle posture change can correctly detected. Furthermore, the suspension control apparatus of the present invention does not have malfunction due to the abrasion of the sliding part e.g. variable resistor used for detecting stroke of the shockabsorber.

As a result, ride comfort and stability of a vehicle posture is improved by using the suspension control apparatus of the present invention, even with simple construction and of low cost.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 8 is a flow chart of operation of the suspension control apparatus according to the present invention.

It will be recognized that some or all of the Figures are schematic representations for purposes of illustration and do not necessarily depict the actual relative sizes or locations of the elements shown.

DESCRIPTION OF THE PREFERRED EMBODIMENTS

Hereafter, preferred embodiments of the suspension control apparatus of the present invention are elucidated with reference to the accompanying drawings of FIGS. 1 to 8.

Figure 1:
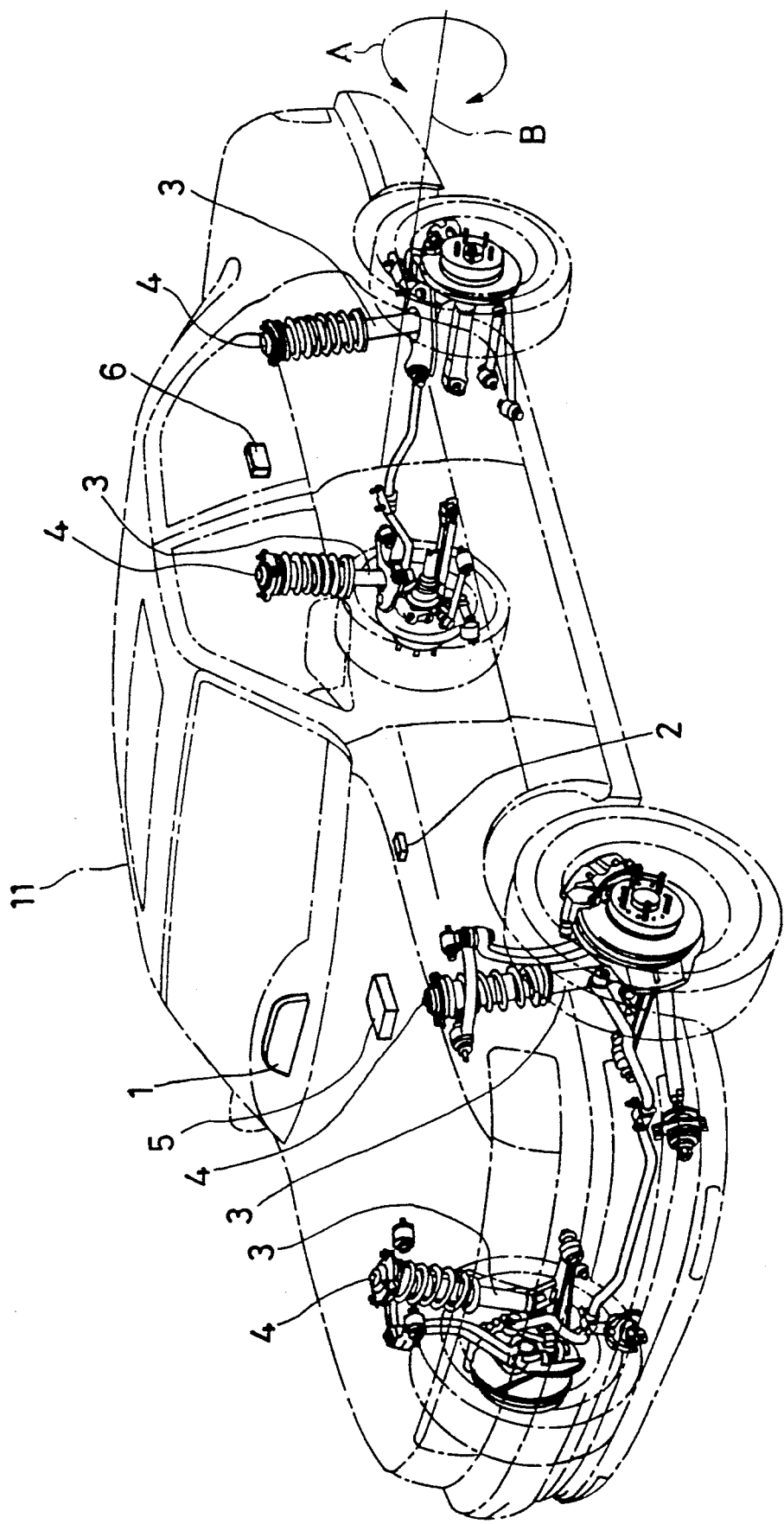
FIG. 1 is a perspective view showing principal parts of a suspension control apparatus of the present invention in a vehicle shown with alternate long and short dash line.

FIG. 1 is a perspective view showing a principal part of the suspension control apparatus which is disposed in a vehicle 11 shown with alternate long and short dash line. The suspension control apparatus comprises a vehicle speed sensor 1, a pitch angular velocity sensor 2, shock absorber 3, actuators 4, a brake switch 5 and a controller 5. The vehicle speed sensor 1, which is disposed in a front grill adjacent a speed meter, produces a signal of vehicle speed by detecting the revolution speed of an output shaft of a gearbox in the vehicle 11. The pitch angular velocity sensor 2 is provided to detect an angular velocity of rotation about a lateral line of vehicle body at substantially a center of the vehicle 11, that is about a pitch axis B of the vehicle 11. The directions of the rotation are shown with arrow A in FIG. 1. The pitch angular velocity sensor 2, for instance described in U.S. Pat. No. 4,671,112, which is issued Jun. 9, 1987 and granted to the same assignee, is usable. The shock absorbers 3 damp the force received by wheels of the vehicle 11. The actuators 4, which are provided on the shock absorbers 3, control the damping force of these shock absorbers 3. The brake switch 5, which operates with ON/OFF control action, detects whether a brake pedal is operated by a driver or not. The controller 6, which is disposed in appropriate space, such as under the back seat or in the trunk, produces the output signal for controlling the damping force of the shock absorber 3. The actuator 4 operates the shock absorber 3 by receiving the signal, which is produced by the controller 6 in response to the output signals of the vehicle speed sensor 1, the pitch angular velocity sensor 2 and the brake switch 5. For instance, the shock absorber 3 is a hydraulic active suspension and its damping rate is controlled by controlling hydraulic valves by electromagnet.

Figure 2:
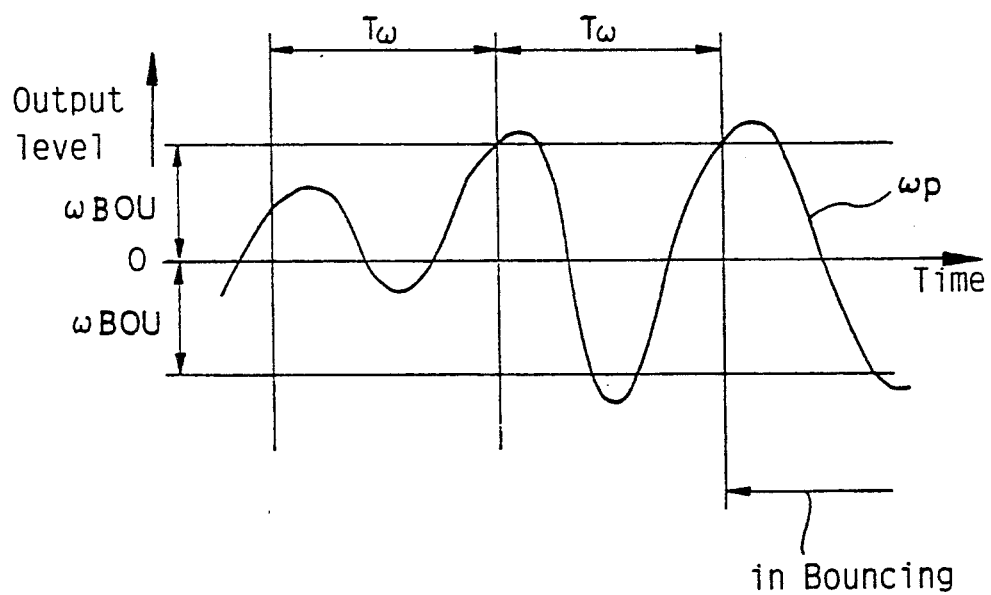
FIG. 2 is a graph of a typical output signal of a pitch angular velocity sensor for detecting bouncing of the vehicle.

FIG. 2 is a graph of a typical output signal $\omega p$ of a pitch angular velocity sensor 2 when the vehicle 11 makes periodic motion, that is, when the vehicle 11, is bouncing. FIG. 2 will be used to explain the method by which the bouncing is inferred or estimated from the output signal ωp of the pitch angular velocity sensor 2. In FIG. 2, when a period Tω of the output signal ωp output from the pitch angular velocity sensor 2 is within a predetermined time range $t_c$, and further an absolute value $|\omega p|$ of the output signal ωp reaches or exceeds a bouncing reference value ωBOU, it is judged that the vehicle 11 is bouncing.

That is, bouncing is determined based on the state of the conditions shown by the following formulas (1) and (2):

$$Tm - t_c < T\omega \leq Tm \tag{1}$$

$$|\omega p| \geq \omega BOU \tag{2}$$

where Tm is the predetermined maximum period, $t_c$ is the predetermined time range between the maximum period and minimum period for judging the bouncing, ωBOU is the bouncing reference value to be changed in response to the vehicle speed.

Table 1 below shows the map for the bouncing detection part 7 of the controller 6, and the above-mentioned bouncing reference value ωBOU is decided by retrieving the map (table 1) by using as address the output signal V of the vehicle speed sensor 1. The bouncing reference value ωBOU1, ωBOU2, ... or ωBOU5 from the map is used as criterion in judgement for bottoming based on different speeds V1-V6 of the vehicle.

TABLE 1

| | Vehicle speed | | | | |
|---|---|---|---|---|---|
| | V1-V2 | V2-V3 | V3-V4 | V4-V5 | V5-V6 |
| amplitude of ωp | ωBOU1 | ωBOU2 | ωBOU3 | ωBOU4 | ωBOU5 |

Table 2 below shows the operating parameters which are found preferable through experiment. At this time, the period Tω of the output signal ωp is set up to satisfy the following inequality (3):

$$0.5 \text{ sec.} < T\omega \leq 1 \text{ sec.} \tag{3}$$

TABLE 2

| | Vehicle speed (km/h) | | | | |
|---|---|---|---|---|---|
| | 0 km/h or more- below 20 km/h | 20 km/h or more- below 40 km/h | 40 km/h or more- below 60 km/h | 60 km/h or more- below 80 km/h | 80 km/h or more |
| ωBOU (deg/sec) | 4.5 | 4.0 | 3.5 | 3.0 | 3.0 |

Apart from the above-mentioned embodiment wherein the bouncing reference value ωBOU is decided by the output signal V of the vehicle speed sensor 1, a modified embodiment may be such that the reference value ωBOU is set constant.

Figure 3:
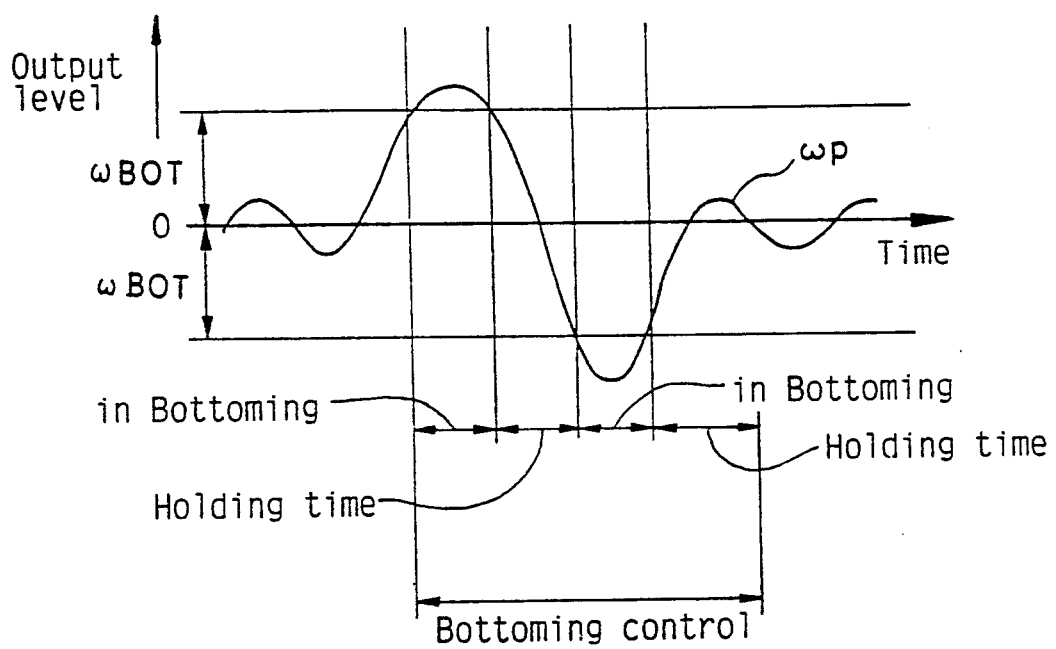
FIG. 3 is a graph of a typical output signal of the pitch angular velocity sensor for detecting bottoming of the vehicle.

FIG. 3 is a graph of a typical output signal ωp of the pitch angular velocity sensor 2 when the vehicle receives a great shock, that is, when the vehicle 11 enters the bottoming. FIG. 3 shows the method how the bottoming is inferred or estimated from the output signal ωp of the pitch angular velocity sensor 2, and the time when the shock absorbes 3 are controlled by the controller 6. In FIG. 3, when the absolute value $|\omega p|$ of the output signal ωp reaches or exceeds a bottoming reference value ωBOT, it is judged that the vehicle 11 is in the bottoming.

That is, the bottoming is determined as the conditions shown by the following formula (4):

$$|\omega p| \geq \omega BOT \tag{4}$$

Table 3 below shows the map for the bottoming detection part 8 of the controller 8. The above-mentioned bottoming reference value ωBOT is decided by retrieving the map (table 3) by using output signal V of the vehicle speed sensor 1. The bottoming reference value ωBOT1, ωBOT2, ... or ωBOT5 from the map is used as the criterion for judgement of bottoming at various speeds V1-V6 of the vehicle 11.

TABLE 3

| | Vehicle speed | | | | |
|---|---|---|---|---|---|
| | V1-V2 | V2-V3 | V3-V4 | V4-V5 | V5-V6 |
| amplitude of ωp | ωBOT1 | ωBOT2 | ωBOT3 | ωBOT4 | ωBOT5 |

Table 4 below shows the operating parameters which have been found preferable through experiments.

TABLE 4

| | Vehicle speed (km/h) | | | | |
|---|---|---|---|---|---|
| | 0 km/h or more- below 20 km/h | 20 km/h or more- below 40 km/h | 40 km/h or more- below 60 km/h | 60 km/h or more- below 80 km/h | 80 km/h or more |
| ωBOT (deg/sec) | 8.2 | 8.0 | 7.5 | 7.0 | 8.5 |

Figure 4:
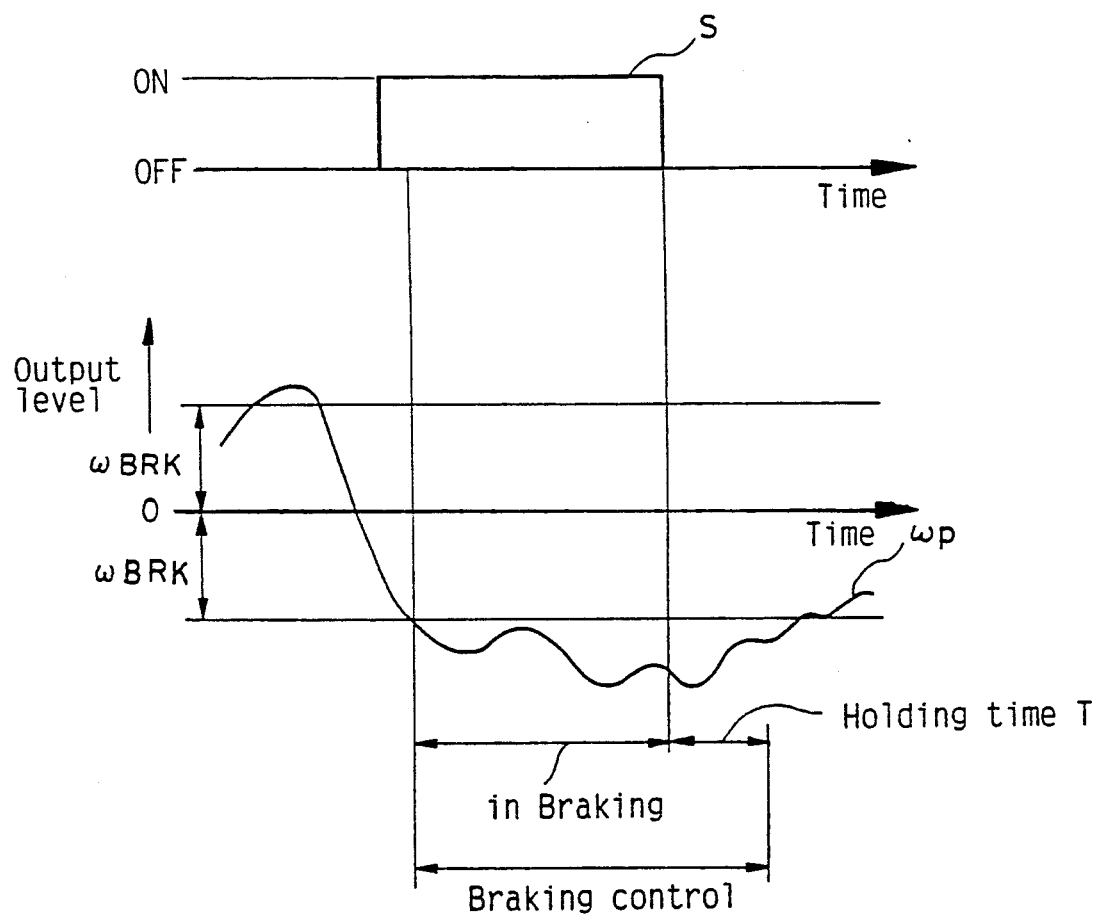
FIG. 4 is a graph of typical output signals of the pitch angular velocity sensor and brake switch for detecting braking of the vehicle.

FIG. 4 is a graph of a typical output signal ωp of the pitch angular velocity sensor 2 when the vehicle 11 is braked, that is, the vehicle 11 is braking. FIG. 4 shows how the braking is inferred or estimated from the output signal ωp of the pitch angular velocity sensor 2 and an output signal S of the brake switch 5. As shown in FIG. 4, when the brake switch 5 is turned to ON-state and further the absolute value $|\omega p|$ of the output signal ωp reaches or exceeds a predetermined braking value ωBRK, it is judged that the vehicle 11 is braking.

That is, the state of braking is judged when the conditions are shown by the following formula (5) and when the brake switch 5 is in ON-state:

$$|\omega p| \geq \omega BRK \tag{5}$$

The following formula (6) shows the preferable operation parameters for judging the braking:

$$|\omega p| \geq 2.3 \text{ deg/sec.} \tag{6}$$

Figure 5:
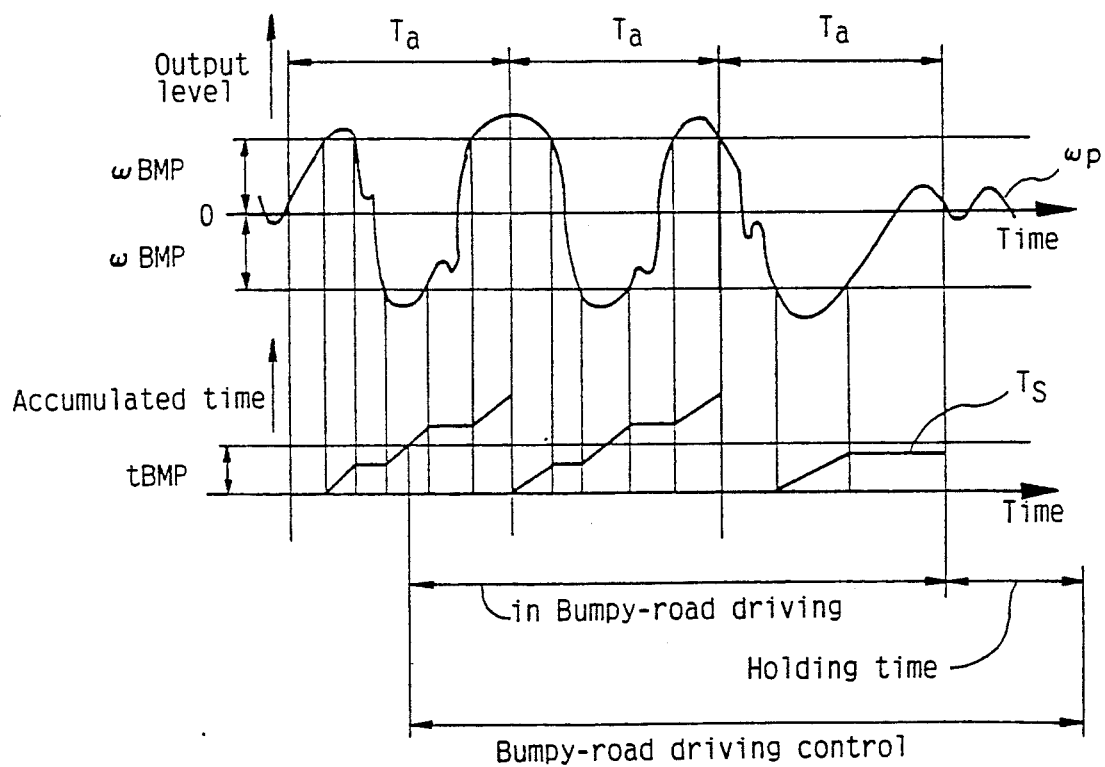
FIG. 5 is a graph of a typical output signal of the pitch angular velocity sensor for detecting bumpy-road driving of the vehicle.
Figure 6:
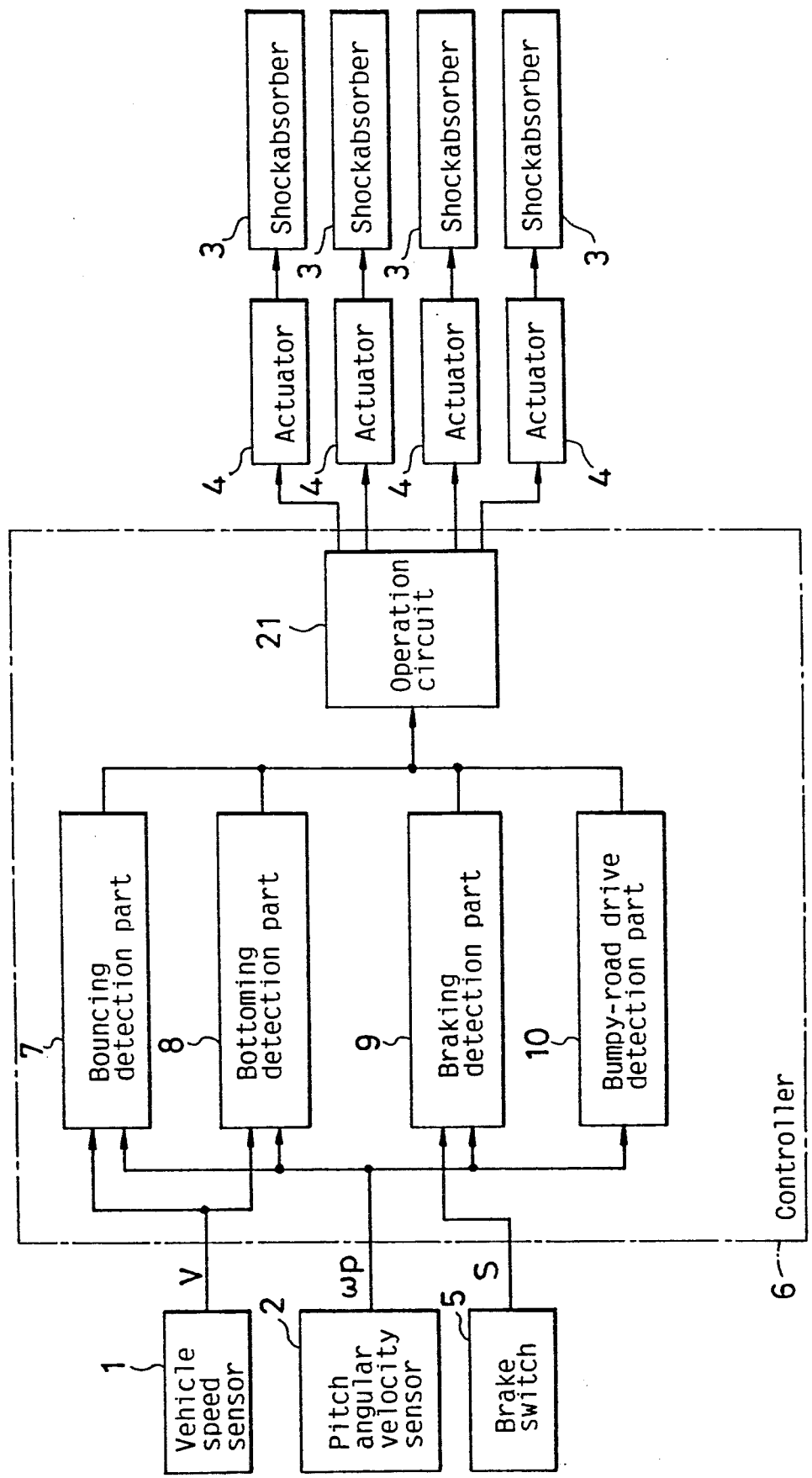

FIG. 5 is a graph of a typical output signal ωp of the pitch angular velocity sensor 2 when the vehicle 11 is driven on a very bumpy road, that is, the vehicle 11 receives continuous shocks. FIG. 5 shows how the bumpy-road driving is inferred from the output signal ωp of the pitch angular velocity sensor 2. In FIG. 5. Ta are constant times, e.g. 1.5 second. Ts is a time period defined by accumulating respective time periods when the absolute value $|\omega p|$ reaches or exceeds the predetermined value ωBMP during each constant time period Ta. When the absolute value $|\omega p|$ of the output signal ωp of the pitch angular velocity sensor 2 reaches or exceeds the predetermined value ωBMP, and the bumpy-road driving time Ts reaches the predetermined time tBMP, it is judged that the vehicle 11 is driving on the very bumpy road.

The following formulas (7) and (8) show the operating parameters of the above-mentioned predetermined value ωBMP and predetermined time tBMP which are found preferable through experiments:

$$|\omega p| \geqq 5.3 \text{ deg/sec} \tag{7}$$

and $$Ts \geqq 0.4 \text{ sec} \tag{8}$$

Figure 8:
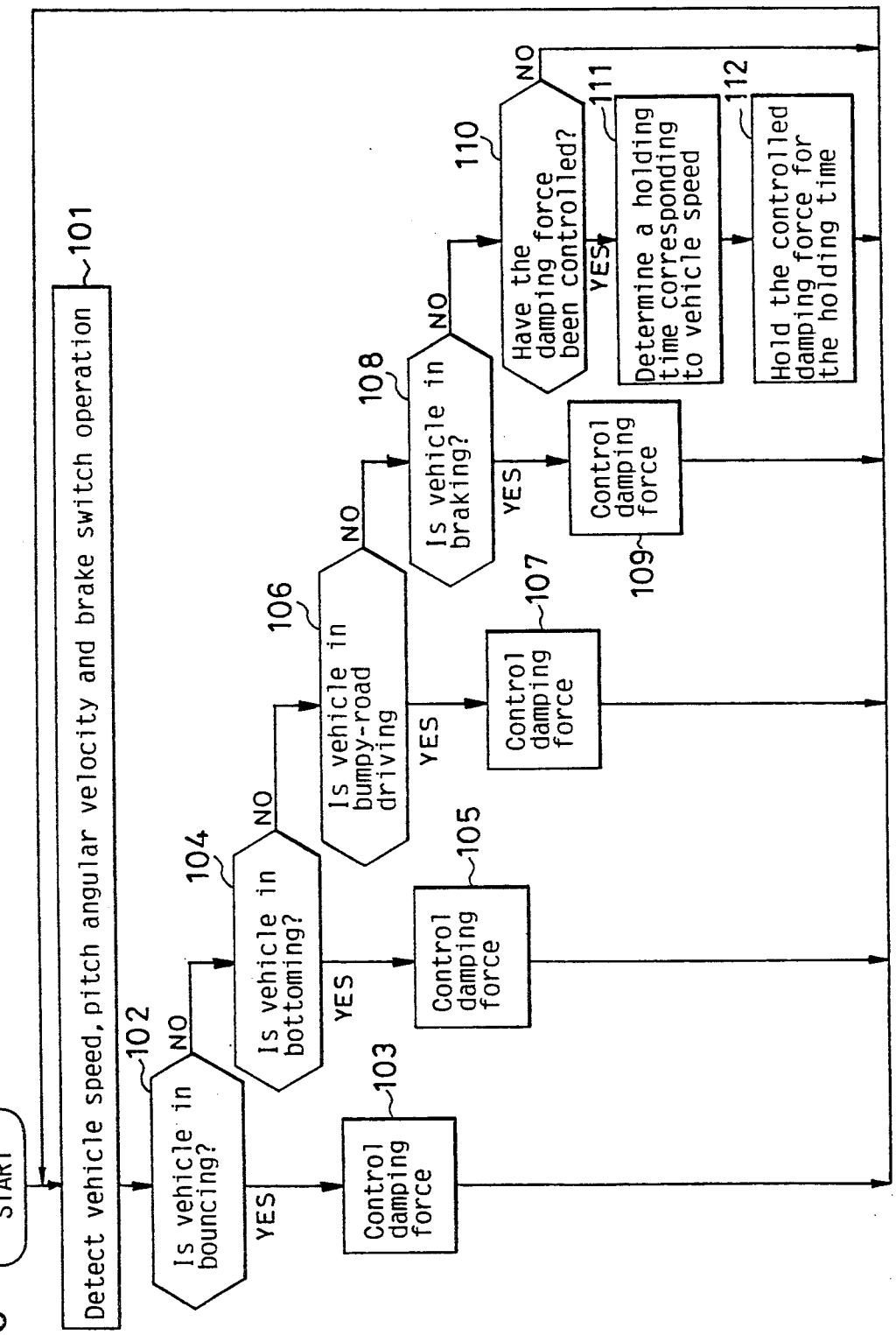
FIG. 8 is a block diagram of the suspension control apparatus shown in FIG. 1.

FIG. 8 shows the block diagram of the suspension control apparatus of the present invention in FIG. 1.

The controller 6 provides the bouncing detection part 7 for detecting the bouncing, the bottoming detection part 8 for detecting bottoming, the braking detection part 9 for detecting braking, the bumpy-road drive detection part 10 for detecting bumpy-road driving and the operation circuit 21 for driving the actuator 4. In actual example, the controller 6 is constituted substantially by an A/D converter, and an arithmetic unit, such as a logical circuit having a CPU, a ROM and a RAM.

The bouncing detection part 7 decides the aforementioned bouncing reference value ωBOU, which is for judging the output signal ωp of the pitch angular velocity sensor 2, by retrieving the map (table 1) with the output signal V of the vehicle speed sensor 1. When the time period Tω of the output signal ωp is within the predetermined time range $t_c$ and the amplitude of the output signal ωp reaches or exceeds the bouncing reference value ωBOU, it is judged that the output signal ωp is produced from the pitch angular velocity sensor 2 of the vehicle 11 of bouncing. And, the bouncing detection part 7 produces an output signal to the operation circuit 21 for controlling the shock absorbers 3 to decrease the bouncing motion received by the vehicle 11.

The bottoming detection part 8 decides the aforementioned bottoming reference value ωBOT, which is for judging the output signal ωp of the pitch angular velocity sensor 2, by retrieving the map (table 3) with the output signal V of the vehicle sensor 1. The amplitude of the output signal ωp reaches or exceeds the bottoming reference value ωBOT, the bottoming detection part 3 judges that the vehicle 11 is in bottoming as shown in FIG. 3. As a result, the bottoming detection part 8 produces an output signal to the operation circuit 21, which is for controlling the shockabsorbers 3 to decrease the bottoming motion received by the vehicle 11. That is, the suspension control apparatus of the invention carries out the bottoming control for the time period designated in FIG. 3 by the words "bottoming control".

The braking detection part 9 infers whether the brake pedal is only touched by a foot of a driver or depressed for braking in practice, from the AND signal of the output signal S of the brake switch 5 and the output signal ωp of the pitch angular velocity sensor 2. If the vehicle 11 is in braking, that is, the brake pedal is operated to decrease the vehicle speed, the braking detection part 9 produces an output signal to the operation circuit 21, thereby to control the shock absorber 3 to restrain the nose-diving motion caused by braking.

The bumpy-road drive detection part 10 detects the bumpy-road driving of the vehicle 11 by using the output signal ωp of the pitch angular velocity sensor 2, as shown in FIG. 5. The bumpy-road drive detection part 10 produces an output signal to the operation circuit 21 for controlling the vehicle posture, to improve the driving stability and riding comfort.

The operation circuit 21 receives the output signal from the bouncing detection part 7, the bottoming detection part 8, the braking detection part 9 or the bumpy-road drive detection part 10. As a result, the operation circuit 21 drives the actuators 4 to change a predetermined damping rate for the damping force of the shock absorber 3.

Apart from the above-mentioned embodiment wherein the shock absorber 3 during bouncing, bottoming, bumpy-road driving or braking is controlled to the predetermined constant damping rate, a modified embodiment may be such that the shock absorber are controlled to change the damping rate in response to each bouncing, bottoming, bumpy-road driving or braking. For example, table 5 below shows the operating parameter for controlling the shock-absorbers in response to bouncing, bottoming, bumpy-road driving or braking.

TABLE 5

|  | normal driving | bouncing | bottoming | braking | bumpy-road driving |
|---|---|---|---|---|---|
| damping rate | 0.2 | 0.63 | 0.57 | 0.6 | 0.4 |

The damping rate in table 5 is given by the following formula (9):

$$\text{Damping rate} = \frac{C}{2\sqrt{M \cdot K}}, \tag{9}$$

where C is the damping coefficient $$\left( SI \text{ units: } \frac{N \cdot \text{sec.}}{m} \right)$$

of the shockabsorber 3 during normal straight driving of the vehicle 11, M is the sprung mass $$\left( SI \text{ units: } \frac{N \cdot \text{sec.}^2}{m} \right)$$

and K is the spring constant $$\left( SI \text{ units: } \frac{N}{m} \right)$$

of the suspension.

Figure 7:
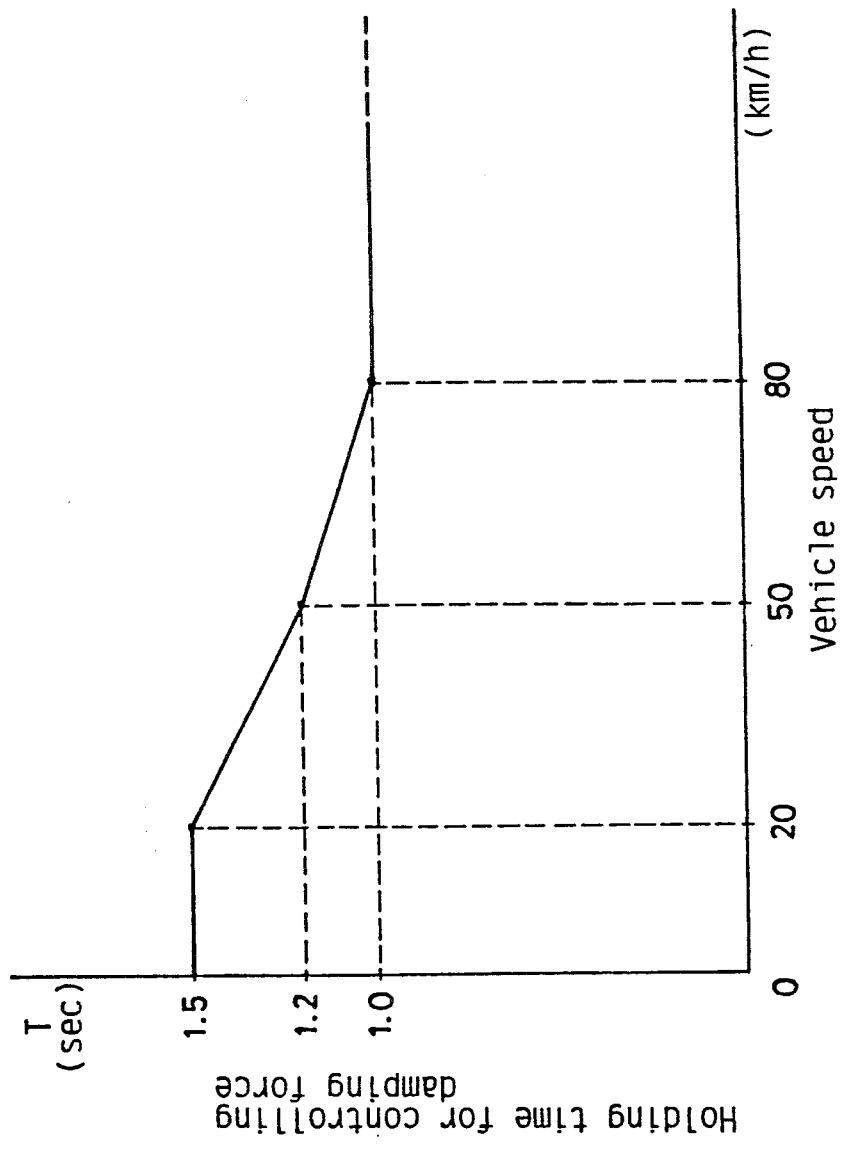
FIG. 7 is a characteristic diagram of the holding time for controlling damping force of the suspension control apparatus shown in FIG. 1.

FIG. 7 shows a characteristic diagram of the holding time T for retaining the damping force after completion of bouncing, bottoming, braking or bumpy-road driving. In case where these states intermittently occur, if the holding time T is not set up, the damping force of the shockabsorber 3 will be frequently changed. As a result, the driving stability and riding comfort become worse by frequent changes of the damping force. Therefore, the vehicle 11 needs retention of the damping force of the shock absorbers 3 for at least a predetermined holding time T after either of bouncing, bottoming, braking or bumpy-road driving as in FIGS. 2, 3, 4 or 5 has been finished.

As shown in FIG. 7, the holding time T in which the increased damping force is retained is to be set the shorter as the vehicle speed becomes the higher. And, when the vehicle speed is above 80 km/h, the holding time T is set up to be constant. such as at 1.0 sec. as shown in FIG. 7. This setting of the operation parameters are experimentally found preferable.

Apart from the above-mentioned embodiment wherein the holding time T is decided in response to the vehicle speed, a modified embodiment may be such that the holding time T is set up constant, or alternatively is set up so as to respond to the displacement length (distance) of the vehicle 11 after finish of the bouncing, the bottoming, the braking or the bumpy-road driving. On the contrary to the above-mentioned embodiments, in case of some kinds of vehicles, such as a coach or a large truck, the holding time T may be set up to become the larger as the vehicle speed is the faster.

FIG. 8 shows a flow chart of operation of the controller 6 of the suspension control apparatus of the present invention.

In step 101 of FIG. 8, the output signal V from the vehicle speed sensor 1, the output signal $\omega p$ from the pitch angular velocity sensor 2 and the output signal S from the brake switch 5 are detected. Next, in step 102, it is judged whether the vehicle 11 is in bouncing or not. That is, it is judged that whether the vehicle 11 is in bouncing or not, under the condition shown by the aforementioned formulas (1) and (2). When the controller 6 decides "YES" in step 102, that is, the vehicle 11 is in the bouncing, the suspension control apparatus controls to increase the damping force of the shockabsorbers 3 in step 103.

When the controller 6 in step 102 decides "NO", that is, the vehicle 11 is not bouncing, it is judged whether the vehicle 11 is in bottoming or not, in step 104. Namely, when the condition is as shown by the aforementioned formula (4), it is judged that the vehicle 11 is in bottoming. When the controller 6 judges "YES" in step 104, that is, the vehicle 11 is bottoming, the suspension control apparatus controls to increase the damping force of the shock absorbers 3 in step 105.

When the controller 6 in step 104 decides "NO", that is, the vehicle 11 is not bottoming, it is judged whether the vehicle 11 is in bumpy-road driving or not, in step 106. Namely, when the aforementioned absolute value $|\omega p|$ of the output signal $\omega p$ reaches or exceeds the predetermined value $\omega BMP$, and further the aforementioned bumpy-road driving time Ts reaches or exceeds the predetermined time tBMP. That is, when the following formulas (10) and (11) are satisfied by the detected signals. It is judged that the vehicle 11 is driving on bumpy-road:

$$|\omega p| \geq \omega BMP \quad (10)$$

and $$Ts \geq tBMP \quad (11)$$

When the controller 6 decides "YES" in step 106, the suspension control apparatus controls to increase the damping force of the shockabsorbers 3 in step 107 in order to enlarge the road contact area of the tire and to improve the riding comfort. As a result, the driving stability in the vehicle 11 is assured even if the vehicle 11 is driven on a very bumpy-road.

When the controller 6 in step 106 decides "NO", that is, the vehicle 11 is not on bumpy-road, it is judged whether the vehicle 11 is braking or not, in step 108. Namely, when the condition is shown by the aforementioned formula (5) and the brake switch 5 is in ON-state, it is judged that the vehicle 11 is in braking. When the controller 6 decides "YES" in step 108, the suspension control apparatus controls to increase the damping force of the shock absorbers 3 in 109, to restrain the nose-diving motion during the braking.

On the contrary, when the controller 6 in step 108 decides "NO", that is, the vehicle 11 is not in braking, the controller 6 judges whether the shockabsorbers 3 have been controlled or not in step 110. When the controller 6 in step 110 decides "YES", that is, it is judged that bouncing, bottoming, bumpy-road driving or braking have finished, a suitable holding time T (which is the time wherein the damping force is controlled after bouncing, bottoming, bumpy-road driving or braking) is decided in response to the output signal V from the vehicle speed sensor 1 in step 111, as has been aforementioned in reference to the waveform shown in FIG. 7. And, in step 112, the controlled damping force of the shockabsorbers 3 are kept for the holding time T after these state have been finished.

After holding the damping force of the shockabsorbers 3 for the holding time T, the shock absorbers 3 return to normal damping force which lasts until the suspension control apparatus detects next bouncing, bottoming, bumpy-road driving or braking.

On the contrary, in step 110, when the controller 6 judges that the shock absorbers 3 have not yet been controlled to increase the damping force for bouncing, bottoming, bumpy-road driving or braking, the shock absorbers 3 are kept in normal condition continuously.

The aforementioned problems of malfunctions of ultra-sonic sensors due to stuck mud or show malfunction due to abrasion in variable resistors in the conventional suspension control apparatus are solved, since the suspension control apparatus of the present invention detects bouncing, bottoming, bumpy-road driving and braking by using only three signals, namely, the output signal V of the vehicle speed sensor 1, the output signal $\omega p$ of the pitch angular velocity sensor 2 and the output signal S of the brake switch 5.

And, in the suspension control apparatus of the present invention, the time required for computing of the controller 6 is short, since the controller 6 carries out a simple computing by using the output signals of the vehicle speed sensor 1, the brake switch 5 and the only one angular velocity sensor. For example, in case of using a CPU of 8 bit as the arithmetic unit, the operation times for computation of a control signal, namely the time period from reception of detection signals the arithmetic unit to issuance of output signal to the actuators 4 takes about only 5 msec. Accordingly, the suspension control apparatus of the present invention can timely and effectively control the damping force to increase in response to a rotation around the pitch axis B of the vehicle 11 when the vehicle 11 is driven on the undulated surface road, big uneven surface road or very bumpy-road.

Furthermore, the driving stability and riding comfort are assured by omission of too frequent changes of the damping force at successive occurrences of various types of road conditions, since the suspension control apparatus of the present invention keeps to control the damping force of the shockabsorbers 3 after the bouncing, bottoming, bumpy-road driving or braking has been finished.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A suspension control apparatus comprising:
a vehicle speed sensor for detecting a speed of a vehicle and producing a speed output signal indicative thereof;
a pitch angular velocity sensor for detecting an angular velocity about a pitch axis of said vehicle and producing a pitch signal indicative thereof;
means for receiving a brake output signal of a brake switch;
shock absorber means having an adjustable damping force which is controlled in response to applied signals;
bouncing detection means, which has a map storing a relation between vehicle speed, pitch angular velocity and a damping force for said shock absorber means, which is based on an amount of bouncing of said vehicle indicated by said vehicle speed and said pitch angular velocity, for, when addressed by a bouncing address comprising said speed output signal of said vehicle speed sensor and said pitch signal of said pitch angular velocity sensor, making a determination of whether said vehicle is bouncing, and when said determination is positive, outputting a damping force corresponding to the bouncing address to said shock absorber means as said applied signal;
bottoming detection means, which has a map storing a relation between said vehicle speed, said pitch angular velocity and a damping force for said shock absorber means, which is based on an amount of bottoming of said vehicle indicated by said vehicle speed and said pitch angular velocity, for, when addressed by a bottoming address comprising said speed output signal of said vehicle speed sensor and said pitch signal of said pitch angular velocity sensor, making a determination of whether said vehicle is bottoming and when said determination is positive, outputting a damping force corresponding to said bottoming address to said shock absorber means as said applied signal;
bumpy-road drive detection means which has a map storing a relation between said vehicle speed, said pitch angular velocity and a damping force for said shock absorber means which is based on an amount of bumpy-road driving of said vehicle indicated by said vehicle speed and said pitch angular velocity, for, when addressed by a bumping address comprising the speed output signal of said vehicle speed sensor and said pitch signal of said pitch angular velocity sensor, making a determination of a bumpy road, and when said determination is positive, outputting a damping force corresponding to said bumping address to said shock absorber means as said applied signal;
braking detection means, which has a map storing a relation between a braking state, said pitch angular velocity and a damping force for said shock absorber means which is based on an amount of braking of said vehicle indicated by said braking state and said pitch angular velocity, for, when addressed by a braking address formed by said brake output signal of said brake switch and said pitch signal of said pitch angular velocity sensor, making a determination of braking, and when positive, outputting a damping force corresponding to said braking address to said shock absorber means as said applied signal; and
operation means, coupled to said bouncing detection means, said braking detection means, said bottoming detection means and said bumpy-road drive detection means, for determining one of said positive determinations in one of said means, and outputting said corresponding damping force when said positive determination is determined, and subsequently checking another of said means to determine if said determination is positive when said determination is not positive in said one of said means.

2. A suspension control apparatus in accordance with claim 1, wherein
said bouncing detection means determines that said vehicle is bouncing and produces said positive determination when said output signal from said pitch angular velocity sensor periodically reaches or exceeds a predetermined value and produces an output signal for adjusting the damping force of said shock absorber means.

3. A suspension control apparatus in accordance with claim 2, wherein
said bouncing detection means includes means for changing said predetermined value to be compared with the output signal of said pitch angular velocity sensor in response to vehicle speed.

4. A suspension control apparatus in accordance with claim 1, wherein
said bouncing detection means produces said damping force signal for increasing the damping force of said shock-absorber means when said bouncing is detected.

5. A suspension control apparatus in accordance with claims 1, 2, 3 or 4, wherein
said bouncing detection means produces an output signal for holding the adjusted damping force of said shock absorber means for a predetermined time after said determination of bouncing is over.

6. A suspension control apparatus in accordance with claim 1, wherein
said bottoming detection means produces said damping force signal for increasing said damping force of said shock absorber means when bottoming is detected.

7. A suspension control apparatus in accordance with claims 1 or 6, wherein
said operation means produces an output signal for holding the adjusted damping force of said shock absorber means for a predetermined time after said determination of bottoming is over.

8. A suspension control apparatus in accordance with claim 1, wherein
said braking detection means produces said damping force signal for increasing the damping force of said shock absorber means when braking is detected.

9. A suspension control apparatus in accordance with claims 1 or 8, wherein
said operation means produces an output signal for holding the adjusted damping force of said shock absorber means for a predetermined time after said determination of braking is over.

10. A suspension control apparatus in accordance with claim 1, wherein
said bumpy-road drive detection means judges that said vehicle is in bumpy-road driving when said output signal reaching or exceeding a predetermined value is produced from said pitch angular velocity sensor over a predetermined constant time during a constant time period, and also said bumpy-road drive detection means produces said damping force signal for adjusting the damping force of shock absorber means.

11. A suspension control apparatus in accordance with claims 1 or 10, wherein
said operation means produces an output signal for holding the adjusted damping force of said shock absorber means for a predetermined time after said determination of bumpy road driving is over.

12. An apparatus as in claim 1, wherein said operation means first checks said bouncing detection means, then said bottoming detection means, then said bumpy-road driving detection means and then said braking means.

* * * * *